United States Patent
Jo et al.

(10) Patent No.: US 12,054,067 B2
(45) Date of Patent: Aug. 6, 2024

(54) COMMUNICATION APPARATUS, COMMUNICATION METHOD, AND ELECTRIC VEHICLE

(71) Applicant: LG Energy Solution, Ltd., Seoul (KR)

(72) Inventors: Jeong-Jae Jo, Daejeon (KR); Jong-Shik Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 547 days.

(21) Appl. No.: 17/413,874

(22) PCT Filed: Aug. 3, 2020

(86) PCT No.: PCT/KR2020/010209
§ 371 (c)(1),
(2) Date: Jun. 14, 2021

(87) PCT Pub. No.: WO2021/049760
PCT Pub. Date: Mar. 18, 2021

(65) Prior Publication Data
US 2022/0063439 A1      Mar. 3, 2022

(30) Foreign Application Priority Data
Sep. 9, 2019   (KR) .................. 10-2019-0111600

(51) Int. Cl.
*H02J 7/00*       (2006.01)
*B60L 53/10*      (2019.01)
(Continued)

(52) U.S. Cl.
CPC ............... *B60L 53/66* (2019.02); *B60L 53/10* (2019.02); *B60L 53/305* (2019.02)

(58) Field of Classification Search
USPC ........................................................ 320/109
See application file for complete search history.

(56) References Cited

U.S. PATENT DOCUMENTS

| 7,941,660 B2 | 5/2011 | Lu et al. |
| 2006/0149963 A1 | 7/2006 | Lu et al. |

(Continued)

FOREIGN PATENT DOCUMENTS

| CN | 105208125 A | 12/2015 |
| CN | 106489286 A | 3/2017 |

(Continued)

OTHER PUBLICATIONS

International Search Report (with partial translation) and Written Opinion issued in corresponding International Patent Application No. PCT/KR2020/010209, dated Aug. 3, 2020.

(Continued)

*Primary Examiner* — Samuel Berhanu
(74) *Attorney, Agent, or Firm* — Morgan, Lewis & Bockius LLP (57) ABSTRACT

Provided are a communication apparatus and a communication method for message exchange with charging equipment, and an electric vehicle comprising the communication apparatus. The communication apparatus includes a communication unit provided to be coupled to the charging equipment through a first communication channel, and a control unit coupled to the communication unit through a second communication channel. The control unit determines a target polling time based on a value set to a time-out flag associated with a request message, when transmitting the request message to the communication unit at a first time point. Subsequently, the control unit periodically checks whether a response message from the charging equipment is received by the communication unit at each target polling time for a waiting period from the first time point to a second time point at which a time-out time associated with the request message has passed from the first time point.

15 Claims, 6 Drawing Sheets

(51) Int. Cl.
*B60L 53/30* (2019.01)
*B60L 53/66* (2019.01)

(56) References Cited

U.S. PATENT DOCUMENTS

| | | | |
|---|---|---|---|
| 2012/0112697 A1* | 5/2012 | Heuer | B60L 53/60 320/109 |
| 2014/0259923 A1 | 9/2014 | Blair | |
| 2015/0281044 A1 | 10/2015 | Kugata | |
| 2016/0044584 A1 | 2/2016 | Jung et al. | |
| 2020/0101850 A1* | 4/2020 | Harty | B60L 55/00 |

FOREIGN PATENT DOCUMENTS

| | | |
|---|---|---|
| CN | 108132896 A | 6/2018 |
| EP | 2979481 A1 | 2/2016 |
| JP | H11-341017 A | 12/1999 |
| JP | 2010-161912 A | 7/2010 |
| JP | 2013-198295 A | 9/2013 |
| JP | 2015061356 A | 3/2015 |
| JP | 6273972 B2 | 2/2018 |
| KR | 10-2000-0065355 A | 11/2000 |
| KR | 10-2008-0005481 A | 1/2008 |
| KR | 10-2014-0121321 A | 10/2014 |
| KR | 10-2018-0049391 A | 5/2018 |
| KR | 10-2018-0092093 A | 8/2018 |
| WO | 2014158279 A1 | 10/2014 |

OTHER PUBLICATIONS

Office Action, dated Jul. 11, 2023, issued in corresponding CN Application No. 202080031444.5. Note: JP2013198295A, KR20000065355A, JPH11341017A, KR20180049391A, JP6273972B2, KR20180092093A, and CN108132896A cited therein are already of record.
Extended European Search Report dated Apr. 19, 2022, issued in corresponding European Patent Application No. 20862370.2.
Bohyun Kwon et al., "Timeout Notification Method for Efficient V2G Communication", The 20th Asia-Pacific Conference on Communication (APCC2014), 2014, pp. 376-381.

* cited by examiner

| M#1 | Supported Application Protocol |
|---|---|
| M#2 | Session Setup |
| M#3 | Service Discovery |
| M#4 | Service Payment Selection |
| M#5 | Contract Authentication |
| M#6 | Charge Parameter Discovery |
| M#7 | Cable Check |
| M#8 | Pre Charge |
| M#9 | Power Delivery |
| M#10 | Current Demand |
| M#11 | Welding Detection |
| M#12 | Session Stop |
| M#13 | Service Detail |
| M#14 | Payment Detail |
| M#15 | Charging Status |
| M#16 | Metering Receipt |
| M#17 | Certificate Installation |
| M#18 | Certificate Update |

COMMUNICATION APPARATUS, COMMUNICATION METHOD, AND ELECTRIC VEHICLE

TECHNICAL FIELD

The present disclosure relates to communication technology for message exchange between a communication apparatus of an electric vehicle and charging equipment.

The present application claims priority to Korean Patent Application No. 10-2019-0111600 filed in the Republic of Korea on Sep. 9, 2019, the disclosure of which is incorporated herein by reference.

BACKGROUND ART

Recently, with the increasing global interest in environmentally friendly energy, the widespread use of electric vehicles with rechargeable batteries are increasing at a high speed.

When an electric vehicle is charged with power from Electric Vehicle Supply Equipment (EVSE) (especially, fast charging), it is necessary to perform data exchange according to the charging procedure between the electric vehicle and the EVSE in a sequential order.

To this end, each of the electric vehicle and the EVSE needs a communication apparatus for communication between them, and the communication apparatus of the electric vehicle may be referred to as an Electric Vehicle Communication Controller (EVCC) and the communication apparatus of the EVSE as a Supply Equipment Communication Controller (SECC).

The communication protocol standards for data transmission and reception between the electric vehicle and the EVSE include ISO/IEC 15118 and DIN SPEC 70121. Each of the standards defines the exchange order of messages to be exchanged between the electric vehicle and the EVSE according to the charging procedure that starts when the electric vehicle is connected to the EVSE and information (for example, the time-out time) associated with each message. When time-out occurs, that is to say, when the electric vehicle did not receive a response message to a request message from the charging equipment within the time-out time associated with the corresponding request message from the time point when the electric vehicle transmitted the corresponding request message to the charging equipment, the charging procedure of the electric vehicle unintentionally ends.

DISCLOSURE

Technical Problem

The present disclosure is designed to solve the above-described problem, and therefore the present disclosure is directed to providing a communication apparatus for performing a polling process of periodically checking whether a response message is received from charging equipment each time the communication apparatus transmits a request message to the charging equipment to reduce the frequency of time-outs occurring during message exchange with the charging equipment, an electric vehicle and a communication method.

These and other objects and advantages of the present disclosure may be understood by the following description and will be apparent from the embodiments of the present disclosure. In addition, it will be easily understood that the objects and advantages of the present disclosure may be realized by the means set forth in the appended claims and a combination thereof.

Technical Solution

A communication apparatus according to an aspect of the present disclosure is for message exchange with charging equipment. The communication apparatus includes a communication unit provided to be coupled to the charging equipment through a first communication channel, and a control unit coupled to the communication unit through a second communication channel. The control unit is configured to identify a value set to a time-out flag associated with a request message, when transmitting the request message to the communication unit through the second communication channel at a first time point. The control unit is configured to determine a target polling time based on the identified value. The control unit is configured to periodically check whether a response message from the charging equipment is received by the communication unit at each target polling time for a waiting period from the first time point to a second time point at which a time-out time associated with the request message has passed from the first time point.

The communication unit is configured to transmit the request message from the control unit to the charging equipment through the first communication channel.

The control unit may be configured to determine the target polling time to be equal to a sum of a default time and a previous polling time, each associated with the request message, when the identified value is equal to a first value.

The control unit may be configured to determine the target polling to be equal to a reference polling time associated with the request message when the identified value is equal to a second value. The reference polling time is equal to or less than the previous polling time.

The control unit may be configured to determine the target polling time to be equal to the previous polling time when the identified value is equal to the second value.

The control unit may be configured to set the time-out flag to be equal to the first value and update the previous polling time to be equal to the target polling time when the response message is received by the communication unit within the waiting period.

The control unit may be configured to set the time-out flag to be equal to the second value when the response message is not received by the communication unit within the waiting period.

The control unit may be configured to set the time-out flag to be equal to the second value and update the previous polling time to be equal to a time calculated by subtracting the default time from the target polling time when the response message is not received by the communication unit within the waiting period.

The first communication channel may be a channel for serial peripheral interface communication. The second communication channel may be a channel for power line communication.

An electric vehicle according to another aspect of the present disclosure includes the communication apparatus.

A communication method for message exchange with the charging equipment according to still another aspect of the present disclosure uses the communication apparatus. The communication method includes transmitting the request message to the communication unit through the second communication channel at the first time point, identifying the value set to the time-out flag, determining the target polling time based on the identified value, and periodically checking whether the response message from the charging equipment is received by the communication unit at each target polling time for the waiting period.

Advantageous Effects

According to at least one of the embodiments of the present disclosure, it is possible to reduce the frequency of time-outs occurring during message exchange with the charging equipment by performing a polling process of periodically checking whether a response message is received from the charging equipment each time the communication apparatus of the electric vehicle transmits a request message to the charging equipment.

In addition, according to at least one of the embodiments of the present disclosure, it is possible to effectively manage the computational amount of the polling process by adaptively adjusting the polling time of the polling process based on the time-out occurrence history during message exchange with the charging equipment.

The effects of the present disclosure are not limited to the above-mentioned effects, and these and other effects will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and may be implemented by hardware or software alone or in combination.

In addition, throughout the specification, it will be further understood that when an element is referred to as being "connected to" another element, it can be directly connected to the other element or intervening elements may be present.

Figure 1:
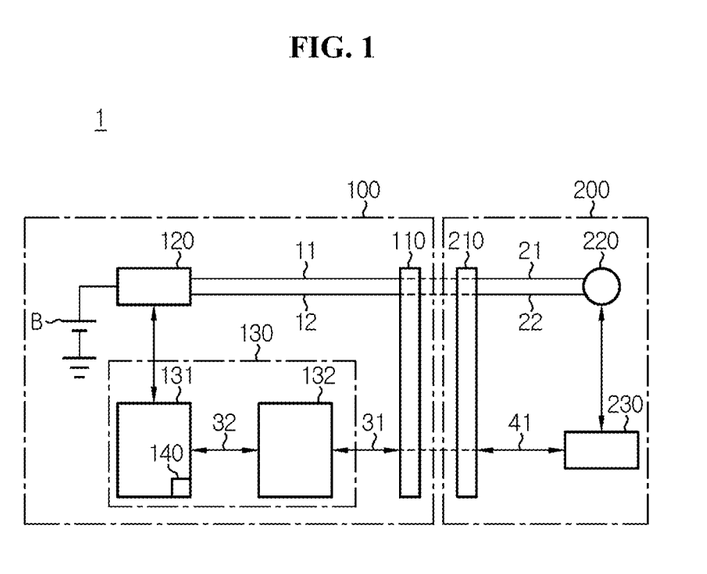
FIG. 1 is a diagram exemplarily showing the architecture of a charging system according to the present disclosure.

FIG. 1 is a diagram exemplarily showing the architecture of a charging system according to the present disclosure.

Referring to FIG. 1, the charging system 1 includes an electric vehicle 100 and charging equipment 200.

The electric vehicle 100 includes a connector 110, a charging circuit 120, a battery B and a communication apparatus 130.

The charging equipment 200 includes a connector 210, a power source 220 and a communication apparatus 230.

The connector 110 is coupled to the charging circuit 120 through an electric line 11 and an electric line 12. Additionally, the connector 110 is coupled to the communication apparatus 130 through a communication channel 31.

The connector 210 is coupled to the power source 220 through an electric line 21 and an electric line 22. Additionally, the connector 210 is coupled to the communication apparatus 230 through a communication channel 41.

The power source 220 is provided to supply charging power (for example, direct current power, alternating current power), and may be, for example, commercial power.

The connector 110 and the connector 210 are provided to be attached and detached to/from each other. When the connector 110 is coupled to the connector 210, the communication apparatus 130 and the communication apparatus 230 are coupled to communicate with each other through the communication channel 31 and the communication channel 41. Additionally, when the connector 210 is coupled to the connector 110, the charging circuit 120 is coupled to the power source 220 through the electric line 11, the electric line 12, the electric line 21 and the electric line 22.

While the connector 110 is coupled to the connector 210, the charging circuit 120 converts the charging power from the power source 220 to the direct current power having a predetermined voltage level in response to a control signal from the communication apparatus 130. The battery B may be charged with the direct current power supplied from the charging circuit 120.

The battery B includes at least one battery cell. For example, the battery cell may be a lithium ion cell. The battery cell is not limited to a particular type if it can be repeatedly recharged.

The communication apparatus 130 includes a control unit 131 and a communication unit 132.

The control unit 131 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing other functions. The control unit 131 may include a memory 140 therein. The memory 140 may store programs and data necessary to perform a method as described below. The memory 140 may include, for example, at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) or programmable read-only memory (PROM).

The communication unit 132 may include known communication chip(s), for example, QCA7005.

When the connector 210 and the connector 110 are coupled to each other, the communication unit 132 is coupled to the communication apparatus 230 to communicate with each other through the communication channel 31 and the communication channel 41. The communication unit 132 and the control unit 131 are coupled through a communication channel 32.

The communication channel 31 may be, for example, a channel for Power Line Communication (PLC). The communication channel 32 may be, for example, a channel for Serial Peripheral Interface (SPI) communication. When the communication unit 132 receives a response message from the communication apparatus 230 through the communication channel 31, the communication unit 132 may transmit the received response message to the control unit 131 through the communication channel 32.

Figure 2:
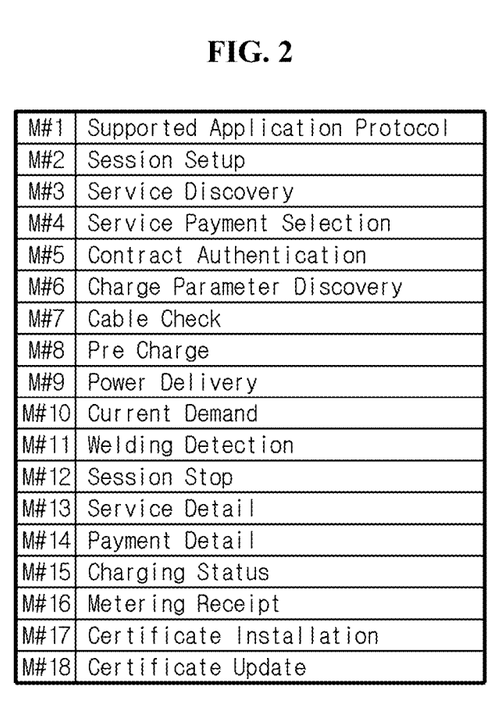
FIG. 2 is a diagram exemplarily showing messages that can be exchanged between a communication apparatus of an electric vehicle of FIG. 1 and charging equipment.

FIG. 2 is a diagram exemplarily showing messages that can be exchanged between the electric vehicle 100 of FIG. 1 and the charging equipment 200.

Assume that M #1~M #18 messages shown in FIG. 2 are exchanged between the communication apparatus 130 and the communication apparatus 230.

When the connector 110 and the connector 210 are connected to each other, the communication apparatus 130 and the communication apparatus 230 may exchange M #1 message to M #18 message in a sequential order according to the charging procedure for the battery B. Each message may be for notifying/acquiring information associated with the state of the electric vehicle 100 and the charging equipment 200 and the charging procedure.

The type of message that may be exchanged between the electric vehicle 100 and the charging equipment 200 is not limited to those shown in FIG. 2, and some of M #1 to M #18 messages may be omitted or different types of messages may be added.

A message that the electric vehicle 100 transmits to the charging equipment 200 is referred to as a 'request message', and a message that the charging equipment 200 transmits to the electric vehicle 100 in response to the request message from the electric vehicle 100 is referred to as a 'response message'.

When the communication apparatus 130 transmits a request message of a specific queue to the communication apparatus 230 and receives a response message from the communication apparatus 230 without time-out, the communication apparatus 130 may transmit the next request message to the communication apparatus 230.

Communication methods according to first to third embodiments of the present disclosure will be hereinafter described with reference to FIGS. 3 to 5. Each of the communication methods for message exchange according to the first to third embodiments may be performed for each of messages that can be exchanged between the electric vehicle 100 and the charging equipment 200.

Figure 3:
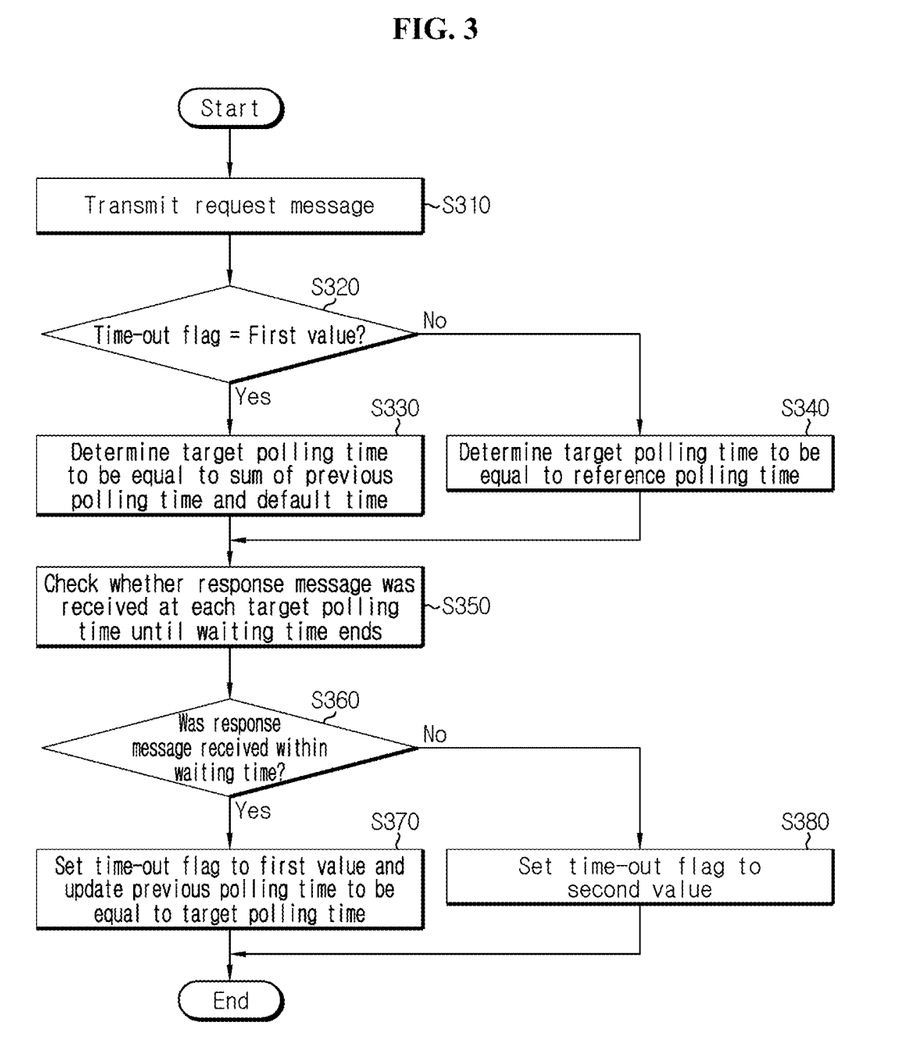
FIG. 3 is a flowchart exemplarily showing a method for message exchange between a communication apparatus of an electric vehicle and charging equipment according to a first embodiment.

FIG. 3 is a flowchart exemplarily showing a method for message exchange between the communication apparatus 130 of the electric vehicle 100 and the charging equipment 200 according to the first embodiment.

Referring to FIG. 3, in step S310, the control unit 131 transmits a request message to the communication unit 132 through the communication channel 32.

In step S320, the control unit 131 determines whether a time-out flag associated with the request message is set to be equal to a first value. The time-out flag set to be equal to the first value indicates that the time-out of the corresponding message did not occur at the charging procedure of the previous cycle. In contrast, the time-out flag set to be not equal to the first value indicates that the time-out of the corresponding message occurred at the charging procedure of the previous cycle. When a value of the step S320 is "Yes", step S330 is performed. When the value of the step S320 is "No", step S340 is performed.

In step S330, the control unit 131 determines a target polling time to be equal to the sum of the previous polling time and a default time.

In step S340, the control unit 131 determines the target polling time to be equal to a reference polling time.

In step S350, the control unit 131 checks whether a response message from the charging equipment 200 is received by the communication unit 132 at each target polling time until a waiting period ends.

In step S360, the control unit 131 determines whether a response message from the charging equipment 200 is received by the communication unit 132 within the waiting period. That is, the control unit 131 determines whether the time-out did not occur. When a value of step S360 is "Yes", step S370 is performed. When the value of the step S360 is "No", step S380 is performed.

In step S370, the control unit 131 sets the time-out flag to the first value, and updates the previous polling time to be equal to the target polling time.

In step S380, the control unit 131 sets the time-out flag to a second value.

Figure 4:
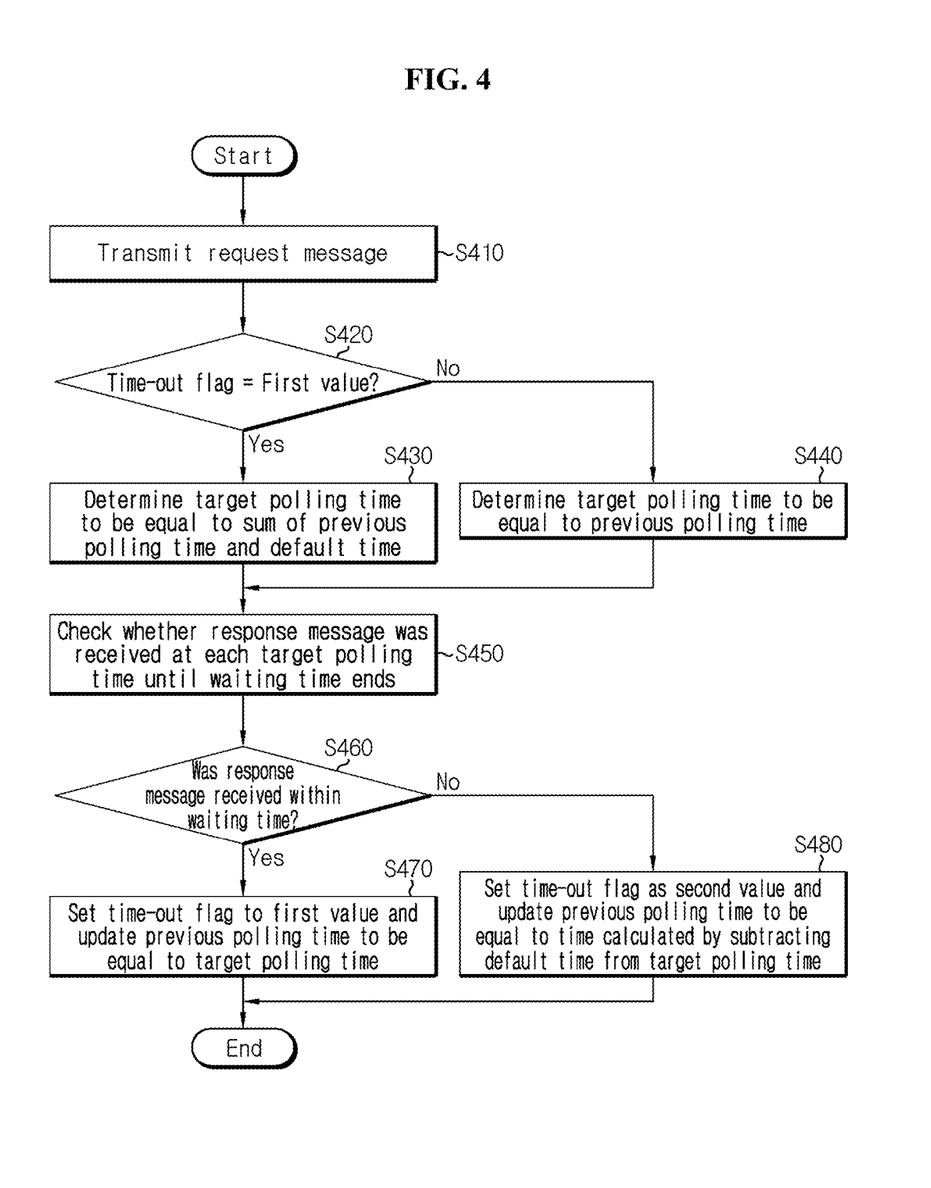
FIG. 4 is a flowchart exemplarily showing a method for message exchange between a communication apparatus of an electric vehicle and charging equipment according to a second embodiment.

FIG. 4 is a flowchart exemplarily showing a method for message exchange between the communication apparatus 130 of the electric vehicle 100 and the charging equipment 200 according to a second embodiment.

Referring to FIG. 4, in step S410, the control unit 131 transmits a request message to the communication unit 132 through the communication channel 32.

In step S420, the control unit 131 determines whether a time-out flag associated with the request message is set to be equal to a first value. When a value of step S420 is "Yes", step S430 is performed. When the value of the step S420 is "No", step S440 is performed.

In step S430, the control unit 131 determines a target polling time to be equal to the sum of the previous polling time and the default time.

In step S440, the control unit 131 determines the target polling time to be equal to the previous polling time.

In step S450, the control unit 131 checks whether a response message from the charging equipment 200 is received by the communication unit 132 at each target polling time until the waiting period ends.

In step S460, the control unit 131 determines whether a response message from the charging equipment 200 is received by the communication unit 132 within the waiting period. That is, the control unit 131 determines whether the time-out did not occur. When a value of the step S460 is "Yes", step S470 is performed. When the value of the step S460 is "No", step S480 is performed.

In step S470, the control unit 131 sets the time-out flag as a first value, and updates the previous polling time to be equal to the target polling time.

In step S480, the control unit 131 sets the time-out flag as a second value, and updates the previous polling time to be equal to the time calculated by subtracting the default time from the target polling time.

Figure 5:
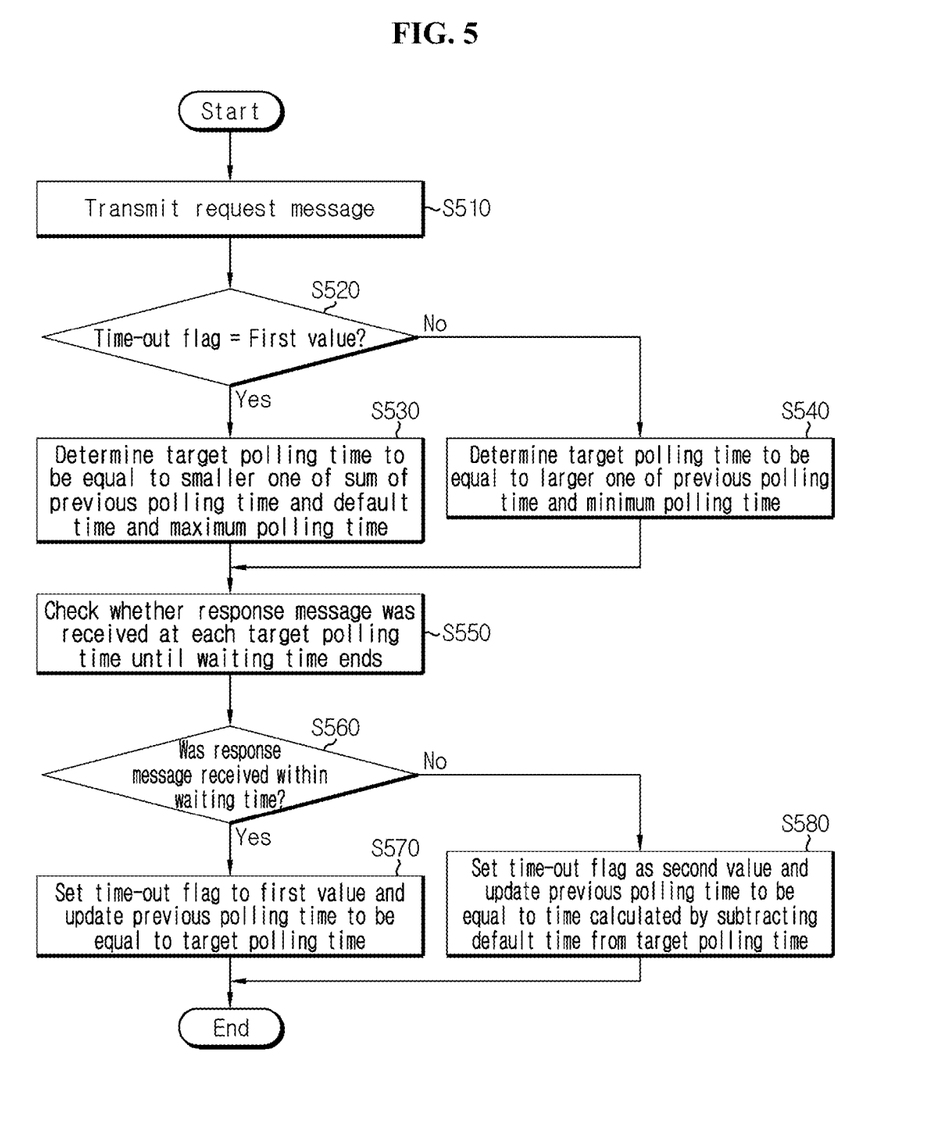
FIG. 5 is a flowchart exemplarily showing a method for message exchange between a communication apparatus of an electric vehicle and charging equipment according to a third embodiment.

FIG. 5 is a flowchart exemplarily showing a method for message exchange between the communication apparatus 130 of the electric vehicle 100 and the charging equipment 200 according to a third embodiment.

Referring to FIG. 5, in step S510, the control unit 131 transmits a request message to the communication unit 132 through the communication channel 32.

In step S520, the control unit 131 determines whether a time-out flag associated with the request message is set to be equal to a first value. When a value of step S520 is "Yes", step S530 is performed. When the value of the step S520 is "No", step S540 is performed.

In step S530, the control unit 131 determines a target polling time to be equal to a smaller one of (i) the sum of the previous polling time and the default time and (ii) a maximum polling time.

In step S540, the control unit 131 determines a target polling time to be equal to a larger one of the previous polling time and the minimum polling time.

The target polling time determined in step S530 or S540 is between the minimum polling time and the maximum polling time. The reference polling time is also between the minimum polling time and the maximum polling time.

In step S550, the control unit 131 checks whether a response message from the charging equipment 200 is received by the communication unit 132 at each target polling time until the waiting period ends.

In step S560, the control unit 131 determines whether a response message from the charging equipment 200 is received by the communication unit 132 within the waiting period. That is, the control unit 131 determines whether the time-out did not occur. When a value of the step S560 is "Yes", step S570 is performed. When the value of the step S560 is "No", step S580 is performed.

In step S570, the control unit 131 sets the time-out flag as a first value, and updates the previous polling time to be equal to the target polling time.

In step S580, the control unit 131 sets the time-out flag as a second value, and updates the previous polling time to be equal to the time calculated by subtracting the default time from the target polling time.

According to the first to third embodiments, when the time-out of the message did not occur at the charging procedure of the previous cycle, the target polling time determined at the current cycles may be longer than the target polling time determined at the previous cycle. Accordingly, it is possible to reduce the computational amount of the control unit 131 for the polling process.

In contrast, when the time-out of the message occurred at the charging procedure of the previous cycle, the target polling time determined at the current cycle may be set to be equal to or less than the target polling time determined at the previous cycle. Accordingly, it is possible to reduce the possibility that the time-out of the message will occur again.

The terms used to describe the first to third embodiments, 'previous polling time', 'default time', 'reference polling time', 'maximum polling time', 'minimum polling time' and 'waiting period', will be additionally described.

Figure 6:
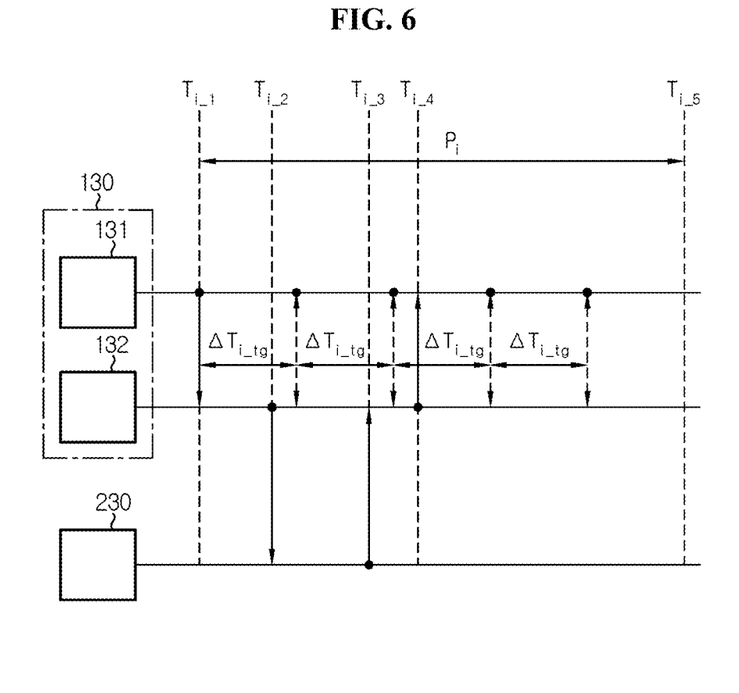
FIG. 6 is a timing chart referenced in describing a polling process associated with a method according to first to third embodiments.

FIG. 6 is a timing chart referenced in describing a polling process associated with the methods according to first to third embodiments.

When i=1~18, FIG. 6 exemplarily shows an exchange process of $i^{th}$ message M #i among M #1 to M #18 messages.

At the time point $T_{i\_1}$, the control unit 131 transmits the $i^{th}$ request message to the communication unit 132 through the communication channel 32.

At the time point $T_{i\_2}$, the communication unit 132 transmits the $i^{th}$ request message from the control unit 131 to the charging equipment 200 through the communication channel 31.

At the time point $T_{1\_3}$, the communication apparatus 230 transmits the $i^{th}$ response message to the communication unit 132 through the communication channel 31.

At the time point $T_{i\_4}$, the communication unit 132 transmits the $i^{th}$ response message from the communication apparatus 230 to the control unit 131 through the communication channel 32.

However, as the control unit 131 does not receive the $i^{th}$ response message from the communication unit 132 due to a malfunction of at least one of the control unit 131 or the communication unit 132, there is a possibility that the time-out of the $i^{th}$ message M #i will occur.

The control unit 131 may perform the $i^{th}$ polling process at the time point to prevent the time-out of the $i^{th}$ message M #i, and its detailed description will be provided below.

The control unit 131 waits for the $i^{th}$ response message to be received for the $i^{th}$ waiting period Pi from the time point $T_{i\_1}$ to the time point $T_{i\_5}$. The time point $T_{1\_5}$ may be a time point at which the $i^{th}$ time-out time associated with the $i^{th}$ message has passed from the time point $T_{i\_1}$. The $i^{th}$ time-out time is a preset $i^{th}$ default value (for example, 2.0 sec), and may be stored in the memory 140.

When the $i^{th}$ polling process starts, the control unit 131 identifies a value set to the $i^{th}$ time-out flag associated with the $i^{th}$ request message. That is, the control unit 131 determines whether the $i^{th}$ time-out flag is set to equal to the first value among the first value (for example, 0) and the second value (for example, 1). The $i^{th}$ time-out flag may be stored in the memory 140. As described above, the $i^{th}$ time-out flag set to be equal to the first value indicates that the time-out of the $i^{th}$ message M #i did not occur in the charging procedure of the previous cycle. In contrast, the $i^{th}$ time-out flag set to be equal to the second value indicates that the time-out of the $i^{th}$ message M #i occurred in the charging procedure of the previous cycle.

The control unit 131 may differently set the $i^{th}$ target polling time $\Delta T_{i\_tg}$, depending on which the $i^{th}$ time-out flag is set to be equal to the first value or the second value.

In detail, when the $i^{th}$ time-out flag is set to be equal to the first value, the $i^{th}$ target polling time $\Delta T_{i\_tg}$ may be determined to be equal to (1) the sum of the $i^{th}$ default time and the $i^{th}$ previous polling time or (2) the $i^{th}$ maximum polling time.

In contrast, when the $i^{th}$ time-out flag is set to be equal to the second value, the $i^{th}$ target polling time $\Delta T_{i\_tg}$ may be determined to be equal to (3) the $i^{th}$ reference polling time, (4) the $i^{th}$ previous polling time or (5) the $i^{th}$ minimum polling time.

The $i^{th}$ previous polling time may be equal to the $i^{th}$ target polling time determined by the control unit 131 in the charging procedure of the previous cycle and stored in the memory 140. When the exchange of the $i^{th}$ message with the charging equipment 200 is performed for the first time, the control unit 131 may use the $i^{th}$ reference polling time as the $i^{th}$ previous polling time.

Each of the $i^{th}$ default time, the $i^{th}$ reference polling time, the $i^{th}$ maximum polling time, the $i^{th}$ minimum polling time and the $i^{th}$ time-out time are preset default values for the $i^{th}$ polling process, and may be stored in the memory 140 of the control unit 131.

The $i^{th}$ reference polling time (for example, 0.040 sec) may be longer than the $i^{th}$ default time (for example, 0.001 sec) and shorter than the $i^{th}$ time-out time (for example, 2.0 sec).

The $i^{th}$ maximum polling time (for example, 0.060 sec) is the upper limit of the polling time that may be used in the $i^{th}$ polling process, and may be longer than the $i^{th}$ reference polling time and shorter than the $i^{th}$ time-out time.

The $i^{th}$ minimum polling time (for example, 0.025 sec) is the lower limit of the polling time that may be used in the $i^{th}$ polling process, and may be longer than the $i^{th}$ default time and shorter than the $i^{th}$ reference polling time.

After the $i^{th}$ target polling time $\Delta T_{i\_tg}$ is determined, until the time point $T_{i\_5}$ is reached, the control unit 131 may periodically check whether the $i^{th}$ response message is received by the communication unit 132 at each $i^{th}$ target polling time $\Delta T_{i\_tg}$. Accordingly, even though the control unit 131 does not receive the $i^{th}$ response message transmitted by the communication unit 132 at the time point $T_{i\_4}$, it is possible to check whether the control unit 131 received the $i^{th}$ response message within the remaining period from the time point $T_{i\_4}$ to the time point $T_{i\_5}$, thereby reducing the possibility that the time-out of the $i^{th}$ message will occur.

The embodiments of the present disclosure described hereinabove are not implemented only through the apparatus and method, and may be implemented through programs that realize the functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure by those skilled in the art without departing from the technical aspects of the present disclosure, the present disclosure is not limited by the foregoing embodiments and the accompanying drawings, and some or all of the embodiments may be selectively combined to make various modifications to the present disclosure.

What is claimed is:

1. A communication apparatus for message exchange with charging equipment, comprising:
   a communicator coupled to the charging equipment through a first communication channel; and
   a controller coupled to the communicator through a second communication channel, the controller being configured to:
   identify a value of a time-out flag associated with a request message, when transmitting the request message to the communicator through the second communication channel at a first time point;
   determine a target polling time based on a default time and a previous polling time, each associated with the request message, if the identified value is equal to a first value; and
   periodically check whether a response message from the charging equipment is received by the communicator at each target polling time for a waiting period from the first time point to a second time point at which a time-out time associated with the request message has passed from the first time point.

2. The communication apparatus according to claim 1, wherein the communicator is configured to transmit the request message from the controller to the charging equipment through the first communication channel.

3. The communication apparatus according to claim 1, wherein the controller is further configured to determine the target polling time to be equal to a sum of the default time and the previous polling time, each associated with the request message, if the identified value is equal to the first value.

4. The communication apparatus according to claim 3, wherein the controller is further configured to:
   determine the target polling time to be equal to a reference polling time associated with the request message if the identified value is equal to a second value; and
   the reference polling time is equal to or less than the previous polling time.

5. The communication apparatus according to claim 3, wherein the controller is further configured to determine the target polling time to be equal to the previous polling time if the identified value is equal to a second value.

6. The communication apparatus according to claim 3, wherein the controller is further configured to set the time-out flag to be equal to the first value and update the previous polling time to be equal to the target polling time if the response message is received by the communicator within the waiting period.

7. The communication apparatus according to claim 4, wherein the controller is further configured to set the time-out flag to be equal to the second value if the response message is not received by the communicator within the waiting period.

8. The communication apparatus according to claim 5, wherein the controller is further configured to set the time-out flag to be equal to the second value and update the previous polling time to be equal to a time calculated by subtracting the default time from the target polling time if the response message is not received by the communicator within the waiting period.

9. The communication apparatus according to claim 1, wherein:
   the first communication channel is a channel for serial peripheral interface communication; and
   the second communication channel is a channel for power line communication.

10. An electric vehicle comprising the communication apparatus according claim 1.

11. A communication method for message exchange with the charging equipment using the communication apparatus according to claim 1, the communication method comprising:

transmitting the request message to the communicator through the second communication channel at the first time point;

identifying the value of the time-out flag;

determining the target polling time based on the default time and the previous polling time if the identified value is equal to the first value; and periodically checking whether the response message from the charging equipment is received by the communicator at each target polling time for the waiting period.

12. The communication apparatus of claim 1, wherein the controller is further configured to determine the target polling time to be equal to a smaller one of a maximum polling time and a sum of the previous polling time and the default time if the identified value is equal to the first value.

13. The communication apparatus of claim 12, wherein the controller is further configured to determine the target polling time to be equal to a larger one of the previous polling time and a minimum polling time if the identified value is equal to a second value.

14. The communication apparatus of claim 12, wherein the controller is further configured to set the time-out flag to be equal to the first value and update the previous polling time to be equal to the target polling time if the response message is received by the communicator within the waiting period.

15. The communication apparatus of claim 12, wherein the controller is further configured to set the time-out flag to be equal to a second value and to update the previous polling time to be equal to a time calculated by subtracting the default time from the target polling time if the response message is not received by the communicator within the waiting period.

* * * * *